United States Patent
Zhang

(10) Patent No.: US 9,961,171 B2
(45) Date of Patent: May 1, 2018

(54) METHOD FOR CONTROLLING ELECTRONIC DEVICE AND ELECTRONIC DEVICE

(71) Applicant: LENOVO (BEIJING) LIMITED, Beijing (CN)

(72) Inventor: Chao Zhang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 724 days.

(21) Appl. No.: 14/554,326

(22) Filed: Nov. 26, 2014

(65) Prior Publication Data

US 2015/0301511 A1    Oct. 22, 2015

(30) Foreign Application Priority Data

Apr. 16, 2014   (CN) .......................... 2014 1 0153877

(51) Int. Cl.
*H04M 1/02* (2006.01)
*G06F 1/16* (2006.01)

(52) U.S. Cl.
CPC ............ *H04M 1/0202* (2013.01); *G06F 1/16* (2013.01)

(58) Field of Classification Search
None
See application file for complete search history.

(56) References Cited

U.S. PATENT DOCUMENTS

| | | | |
|---|---|---|---|
| 9,307,061 B2* | 4/2016 | Nikula | G06F 1/1626 |
| 9,557,874 B2* | 1/2017 | Franklin | G06F 1/1626 |
| 2006/0099808 A1* | 5/2006 | Kondo | F16F 9/532 |
| | | | 438/674 |
| 2013/0131887 A1* | 5/2013 | Park | G05B 11/01 |
| | | | 700/303 |
| 2014/0098095 A1 | 4/2014 | Lee et al. | |
| 2014/0004906 A1 | 6/2014 | Chi et al. | |
| 2015/0195926 A1* | 7/2015 | Kandur Raja | G06F 1/1605 |
| | | | 348/373 |

FOREIGN PATENT DOCUMENTS

| | | |
|---|---|---|
| CN | 102142207 A | 8/2011 |
| CN | 102820004 A | 12/2012 |

* cited by examiner

*Primary Examiner* — Ronald D Hartman, Jr.
(74) *Attorney, Agent, or Firm* — Scully Scott Murphy & Presser

(57) ABSTRACT

The present disclosure provides a method for controlling an electronic device and an electronic device, to enable the electronic device to autonomously deform to be matched with an accommodating space thereof, thereby improving intelligence of the electronic device and providing good user experience. The method includes: acquiring, through a first detection sensor arranged on the electronic device, a space parameter representing an accommodating space where the electronic device is located, when a deformable structure of the electronic device is in a first form; and acquiring, based on the space parameter, a first control instruction to control the deformable structure to deform from the first form to a second form, and thus cause a deformation of the electronic device that makes the electronic device matched with the accommodating space, and controlling the deformable structure to remain in the second form before acquiring a second control instruction for controlling the deformable structure to deform from the second form to a third form, the third form being the same as or different from the first form.

15 Claims, 6 Drawing Sheets

METHOD FOR CONTROLLING ELECTRONIC DEVICE AND ELECTRONIC DEVICE

CROSS-REFERENCE TO RELATED APPLICATION

This application claims priority to the Chinese Patent Application No. 201410153877.4, filed on Apr. 16, 2014, entitled "Method for Controlling Electronic Device and Electronic Device", which is incorporated herein by reference in its entirety.

TECHNICAL FIELD

The present disclosure relates to electronic technology, and more particularly, to a method for controlling an electronic device and an electronic device.

BACKGROUND

With development of science and technology, a growing number of electronic devices are introduced to people's lives, such as mobile phones, tablets, notebooks, smart televisions and the like, and these electronic devices bring great convenience to people's lives.

Currently, an electronic device such as a tablet or a smart phone has at least a housing mostly made of rigid material, and cannot deform in any way. When the electronic device is placed in an accommodating space, for example, inserting a smart phone into a user's pants pocket, the smart phone fits the space of the pocket, i.e., the accommodating space of the smart phone. When the user sits down, the space in the pocket is changed. However, the smart phone cannot deform, and thus there occurs a problem that such conventional electronic device cannot autonomously become matched with the accommodating space thereof. In this case, the mobile phone is susceptible to damage, and the user may feel pain as the smart phone leans against the user's body.

SUMMARY

The present disclosure provides a method for controlling an electronic device and an electronic device, to enable the electronic device to autonomously deform to be matched with an accommodating space thereof, thereby improving intelligence of the electronic device and providing good user experience.

In a first aspect, a method for controlling an electronic device is provided, comprising:

acquiring, through a first detection sensor arranged on the electronic device, a space parameter representing an accommodating space where the electronic device is located, when a deformable structure of the electronic device is in a first form; and acquiring, based on the space parameter, a first control instruction to control the deformable structure to deform from the first form to a second form, and thus cause a deformation of the electronic device that makes the electronic device matched with the accommodating space, and controlling the deformable structure to remain in the second form before acquiring a second control instruction for controlling the deformable structure to deform from the second form to a third form, the third form being the same as or different from the first form.

Alternatively, acquiring, based on the space parameter, a first control instruction to control the deformable structure to deform from the first form to a second form, and thus cause a deformation of the electronic device that makes the electronic device matched with the accommodating space further comprises:

acquiring, based on the space parameter, the first control instruction to control the deformable structure to deform to the second form, and thus cause a deformation of the electronic device that reduces a distance between at least a part of the electronic device and at least one surface surrounding the accommodating space.

Alternatively, acquiring, based on the space parameter, a first control instruction to control the deformable structure to deform from the first form to a second form, and thus cause a deformation of the electronic device that makes the electronic device matched with the accommodating space further comprises:

acquiring, based on the space parameter, the first control instruction to control the deformable structure to deform to the second form, and thus cause a deformation of the electronic device that increases a distance between at least a part of the electronic device and at least one surface surrounding the accommodating space.

Alternatively, acquiring, based on the space parameter, a first control instruction to control the deformable structure to deform from the first form to a second form, and thus cause a deformation of the electronic device that makes the electronic device matched with the accommodating space further comprises:

determining, based on the space parameter, whether at least one surface of the accommodating space meets a first preset condition; and if so, acquiring, based on the space parameter, the first control instruction to control the deformable structure to deform from the first form to the second form, and thus cause a deformation of the electronic device that makes the electronic device matched with the accommodating space.

Alternatively, acquiring, through a first detection sensor arranged on the electronic device, a space parameter representing an accommodating space where the electronic device is located, the method further comprises:

acquiring, through a second detection sensor, a current state of the electronic device; and when the current state meets a second preset condition, controlling the first detection sensor to acquire the space parameter representing the accommodating space where the electronic device is located.

Alternatively, detecting, through a second detection sensor, to acquire a current state of the electronic device further comprises:

detecting, through the second detection sensor, a motion state of the electronic device, wherein when it is detected that the current motion state changes from a first state to a second state, it indicates that the current state meets the second preset condition.

Alternatively, detecting, through a second detection sensor, to acquire a current state of the electronic device further comprises:

detecting, through the second detection sensor, a current contact state between the electronic device and at least one surface surrounding the accommodating space, wherein when the current contact state meets a third preset condition, it indicates that the current state meets the second preset condition.

Alternatively, acquiring, through a first detection sensor arranged on the electronic device, a space parameter representing an accommodating space where the electronic device is located further comprises:

acquiring, through the first detection sensor, a detection result representing a current state of the electronic device; and acquiring the space parameter based on the detection result.

In a second aspect, an electronic device is provided, comprising:

a controller arranged in the electronic device;

a deformable structure arranged on the electronic device and connected to the controller;

a first detection sensor arranged on the electronic device and connected to the controller, wherein, when the deformable structure is in a first form, the controller acquires, through the first detection sensor, a space parameter representing an accommodating space where the electronic device is located, acquires, based on the space parameter, a first control instruction to control the deformable structure to deform from the first form to a second form, and thus cause a deformation of the electronic device that makes at least a part of the electronic device matched with the accommodating space, and controls the deformable structure to remain in the second form before acquiring a second control instruction for controlling the deformable structure to deform from the second form to a third form, the third form being the same as or different from the first form.

Alternatively, the first detection sensor is an image sensor arranged on at least a first surface of the electronic device, and the controller acquires, through the image sensor, an image parameter of a part of the accommodating space, and the controller controls the deformable structure to deform to the second form and thus cause the first surface to approach or move away from at least one surface surrounding the part of the accommodating space, the part of the accommodating space being a part of the accommodating space to which the first surface is orientated.

Alternatively, the first detection sensor is a distance sensor arranged on at least a first surface of the electronic device, and the controller acquires, through the distance sensor, a distance parameter representing a distance between at least one surface surrounding a part of the accommodating space and the first surface, and the controller controls the deformable structure to deform to the second form and thus cause the first surface to approach or move away from the at least one surface, the part of the accommodating space being a part of the accommodating space to which the first surface is orientated.

Alternatively, the first detection sensor is a contact sensor at least arranged on a first surface of the electronic device, and the controller acquires, through the contact sensor, a contact state parameter representing a contact state between at least one surface surrounding a part of the accommodating space and the first surface, and the controller controls the deformable structure to deform to the second form and thus cause the first surface to approach or move away from the at least one surface, the part of the accommodating space being a part of the accommodating space to which the first surface is orientated.

Alternatively, the electronic device has a second surface on which a display unit is arranged, and the controller controls the deformable structure to deform, and thus cause a deformation of the display unit that makes the display unit matched with the accommodating space.

Alternatively, the first detection sensor is a single sensor or an array of sensors arranged on at least one surface of the electronic device.

Alternatively, the electronic device further comprises a second detection sensor through which a current state of the electronic device can be acquired, and when the current state meets a second preset condition, the first detection sensor is controlled to acquire the space parameter representing the accommodating space where the electronic device is located.

Alternatively, the controller controls the deformable structure to deform to the second form, and thus cause a deformation of the electronic device that makes the electronic device act as at least a part of an annular space or a near-annular space meeting a fourth preset condition, the annular space or the near-annular space being capable of surrounding a columnar body meeting a fifth preset condition.

Alternatively, the deformable structure is a frame arranged on an edge of a housing of the electronic device, the frame being comprised of hinge or made of memory metal.

The present disclosure provides the following beneficial effects.

When a deformable structure of the electronic device is in a first form, a space parameter representing an accommodating space where the electronic device is located is acquired through a first detection sensor arranged on the electronic device. Then a first control instruction is acquired based on the space parameter, for controlling the deformable structure to deform from the first form to a second form, and thus cause a deformation of the electronic device that makes the electronic device matched with the accommodating space. The deformable structure is controlled to remain in the second form before acquiring a second control instruction. That is, when the deformable structure is in a first form, the above space parameter is acquired by the first detection sensor, and then the deformable structure is controlled based on the parameter, causing the electronic device to deform along with the deformable structure to be matched with the accommodating space thereof. In this way, the electronic device can autonomously deform to a shape matched with the accommodating space thereof based on the acquired space parameter, without requirement for any external force. This effectively solves the problem that the conventional electronic device cannot autonomously become matched with the accommodating space, and enables the electronic device to autonomously deform to be matched with the accommodating space, thereby improving intelligence of the electronic device and providing good user experience.

DETAILED DESCRIPTION OF THE EMBODIMENTS

In view of the problem that the conventional electronic device cannot autonomously become matched with the accommodating space thereof, the present application provides a method for controlling an electronic device and an electronic device.

In order to make the purposes, technical solutions, and advantages of the embodiments of the present disclosure more clear, the technical solutions in the embodiments of the present disclosure will be clearly and completely described below with reference to the drawings of the embodiments of the present disclosure. Obviously, the embodiments as described are merely a part of the embodiments of the present disclosure instead of all of the embodiments. All other embodiments obtained by those skilled in the art based on the embodiments of the present disclosure without any creative efforts should belong to the scope protected by the present disclosure.

The term "and/or" herein merely is an association relationship for describing associated objects, and represents that there may be three relationships. For example, A and/or B may represent three cases, i.e., only A, both A and B, or only B. In addition, a character "/" herein generally represents there is a "or" relationship between two associated objects prior to and behind the character "/".

Preferable implementations of the present disclosure will be described in detail below in combination with accompanying drawings.

Figure 1:
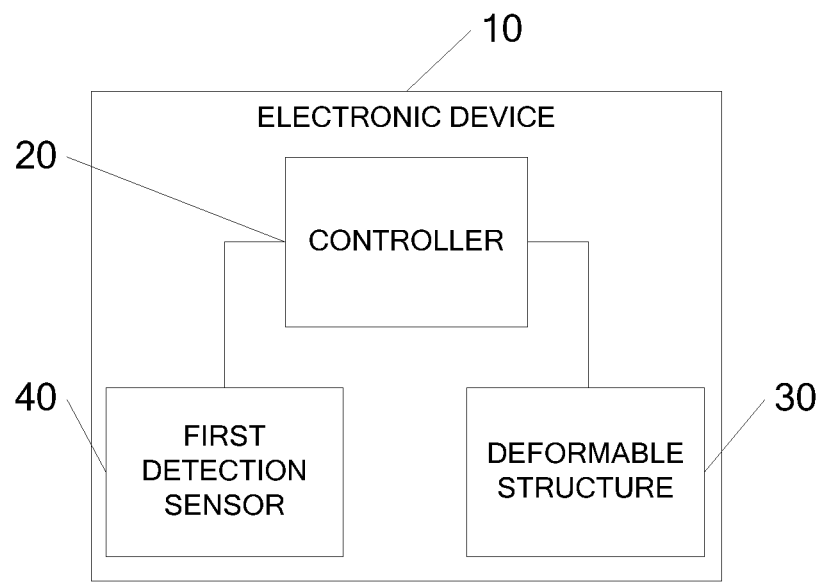
FIG. 1 is a functional block diagram of an electronic device according to an embodiment of the present disclosure.

In an embodiment of the present application, a method for controlling an electronic device applied to the electronic device is provided, wherein the electronic device may be a smart phone, a tablet, a wearable device, a multimedia player and the like. As shown in FIG. 1, illustrated is a functional block diagram of an electronic device 10, which includes a controller 20, a deformable structure 30, and a first detection sensor 40. The controller 20 is arranged in the electronic device 10, and the deformable structure 30 and the first detection sensor 40 are arranged on the electronic device 10. The controller 20 is connected to the deformable structure 30 and the first detection sensor 40 respectively, and can control the deformable structure 30 to deform.

In practical applications, the first detection sensor 40 may be any of many types of sensors or a combination thereof. For example, the first detection sensor 40 may be an image sensor, a distance sensor, a contact sensor and the like. A type of the sensor may be selected by those skilled in the art according to practical requirements, which is not limited in the present application. The contact sensor described here is a sensor for detecting through contact with an object, for example, a pressure sensor, a touch screen and the like.

Figure 2:
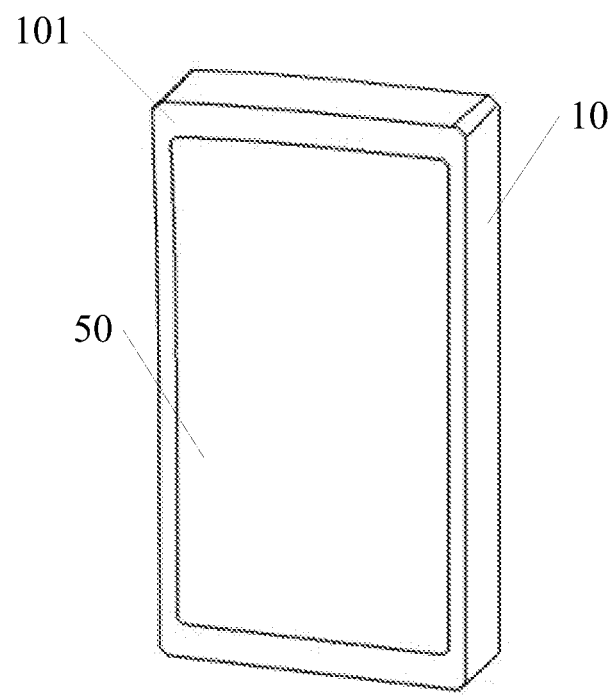
FIG. 2 is a schematic diagram showing a structure of an electronic device according to an embodiment of the present disclosure.

Alternatively, as shown in FIG. 2, a structural diagram of an electronic device 10 is illustrated, which may further include a deformable display unit 50 arranged on a first surface 101 of the electronic device 10. The display unit 50 may be a flexible display screen.

Alternatively, the first surface 101 has two long sides and two short sides. The two long sides are connected to the two short sides at their ends to form a rectangle, in which the two long sides are opposite to each other, and the two short sides are opposite to each other.

In the present embodiment, the first detection sensor 40 may be a single sensor or an array of sensors, and arranged on at least one surface of the electronic device 10. For example, the first detection sensor 40 is arranged on the first surface 101, or may be arranged on another surface of the electronic device 10.

In the present embodiment, the deformable structure 30 may be but is not limited to one of the following two structures.

Figure 3A:
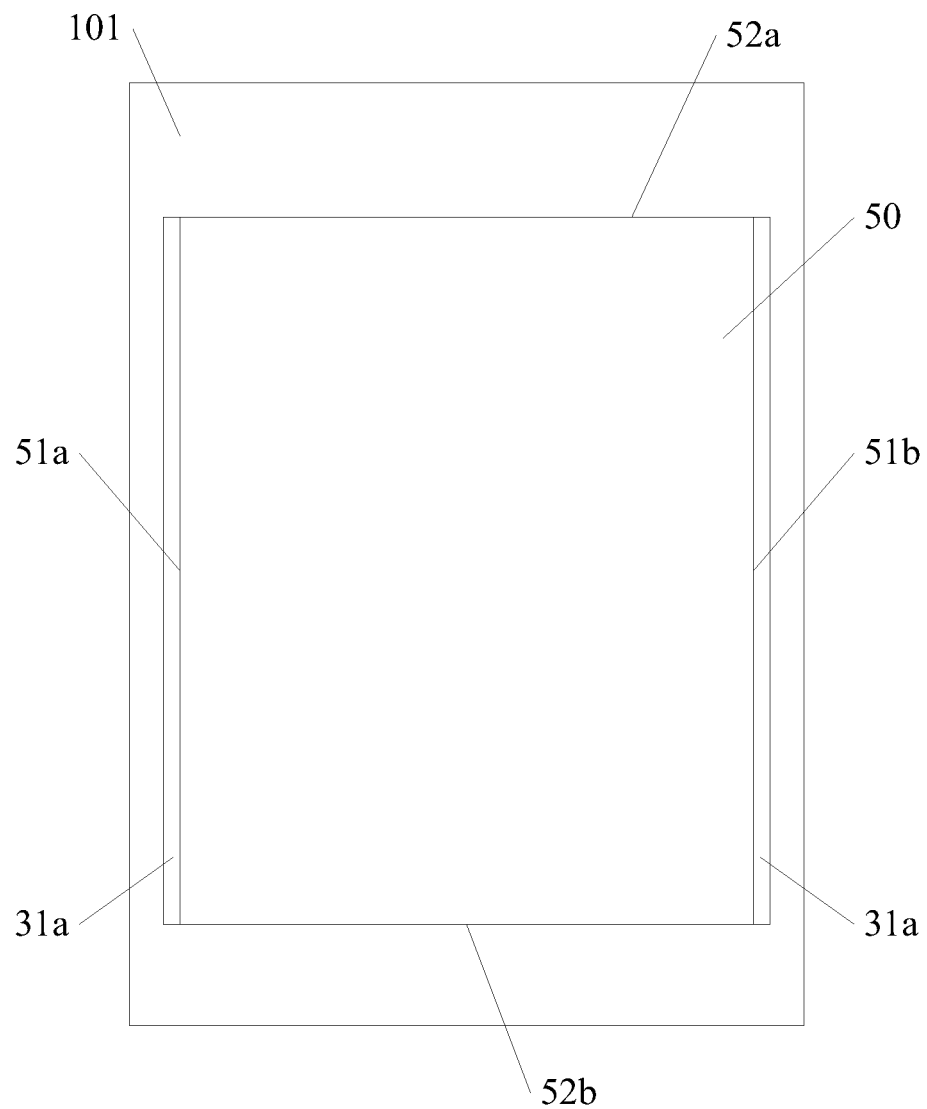
FIGS. 3A-3B are schematic diagrams showing a relative position relationship between a deformable structure and an electronic device according to an embodiment of the present disclosure.

In a first structure, the deformable structure 30 is a connection member 31a for flexibly connecting at least two sides of the display unit 50 with the first surface 101. As shown in FIG. 3A, the display unit 50 has two long sides 51a and 51b and two short sides 52a and 52b. The connection member 31a may be arranged on a first side of the display unit 50 such as the side 51a, and a second side of the display unit 50 such as the side 51b opposite to the side 51a. Alternatively, the connection member 31a may be arranged on the other sides of the display unit 50, such as the two short sides, or may be arranged on all the sides, or may be arranged on multiple corners of the display unit 50, which is not limited in the present application.

In practical applications, the connection member 31a may be an assembly of multiple slide rails and multiple slide vanes. The slide rails are fixed on the electronic device 10. The slide vanes are embedded in the slide rails and each has an end connected to the display unit 50. A deformation of the display unit 50 deforms will cause the slide vanes to slide in the slide rails, and accordingly a distance between the electronic device 10 and the display unit 50 is increased or reduced. The connection member 31a may also be an elastic connection member, such as a light spring, a rubber sheet, a fabric sheet and the like, which has one end fixed on the electronic device 10 and the other end fixed on the display unit 50. When the display unit 50 deforms, the deformation will cause the connection member to stretch or contract, and accordingly the distance between the electronic device 10 and the display unit 50 is increased or reduced.

It should be noted that the connection member 31a may be formed integral with the display unit 50, or adhered to the display unit 50, or solder-bonded to the display unit 50, which is not limited in the present application.

Figure 3B:
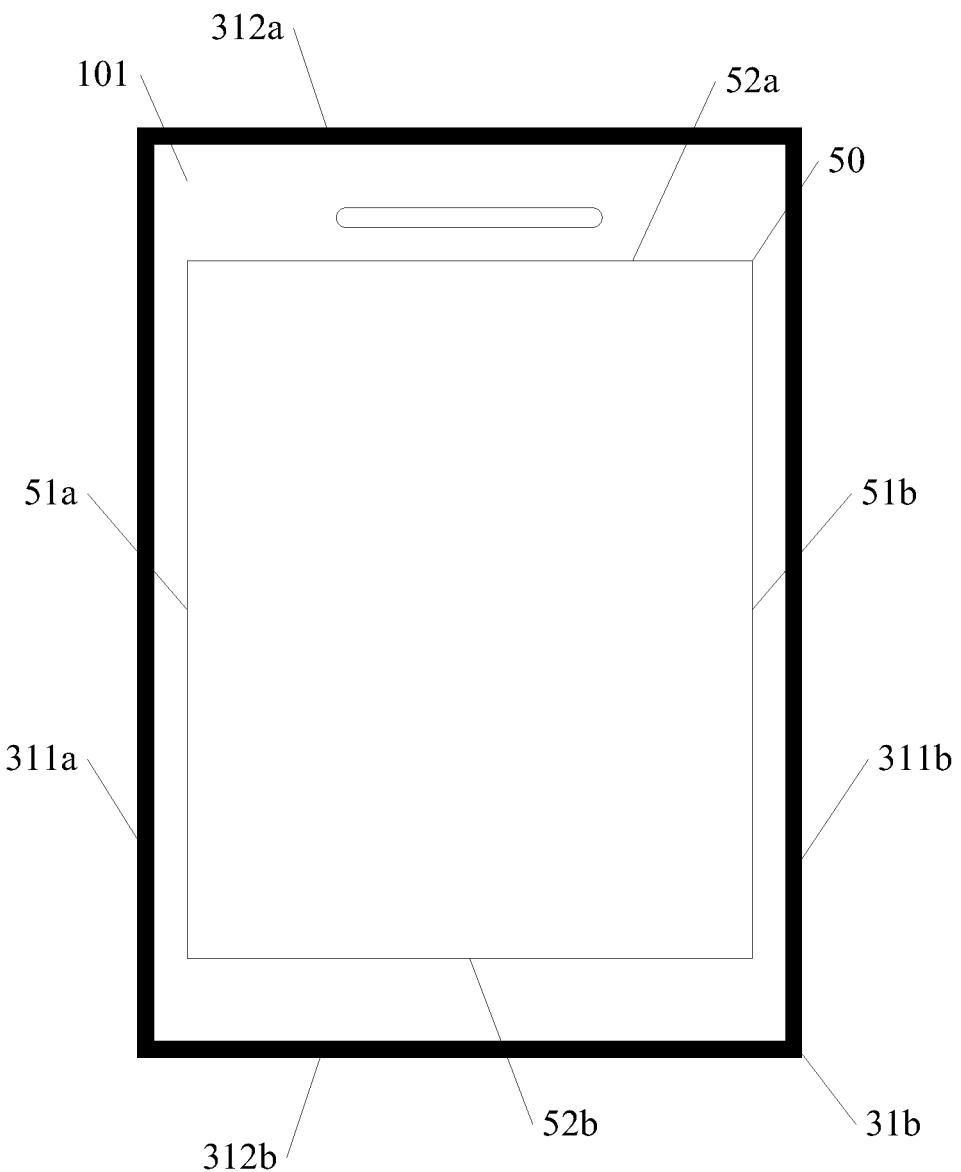

In a second structure, as shown in FIG. 3B, the deformable structure 30 is a frame 31b arranged on the edge of the electronic device 10. In an example, the frame 31b is a rectangular frame of two long sides and two short sides. The long sides are sides 311a and 311b, and the short sides are sides 312a and 312b. The frame 31b may also be a polygon frame, or a frame of irregular shape, which is not limited in the present application. In the present embodiment, the frame 31b is a rectangular frame.

Further, the frame 31b may be made of memory metal. When different voltages are applied to both ends of any side of the frame 31b, the side will deform differently. Further, the frame 31b may also be a hinge. Each section of the hinge may be controlled by the controller 20 to move with respect to the electronic device 10, and thus cause the whole frame 31b to deform. In practical applications, the frame 31b may also be of some other structure designed by those skilled in the art and is not limited in the present application, as long as the frame can deform.

The deformable structure 30 is not limited to the above two structures, and is not limited in the present application.

It should be noted that in practical applications, the above controller 20 may be a Central Process Unit (CPU) in the electronic device 10, or a secondary controller connected to the CPU, such as an Embedded Controller (EC). If the electronic device 10 is a smart phone or a tablet, the controller 20 may be an Application Processor (AP), or a Communication Processor (CP). The CP described here is generally a secondary processor connected to the AP. The CP may also be a CP in a parallel architecture of an AP and the CP, which is not limited in the present application.

Figure 4:
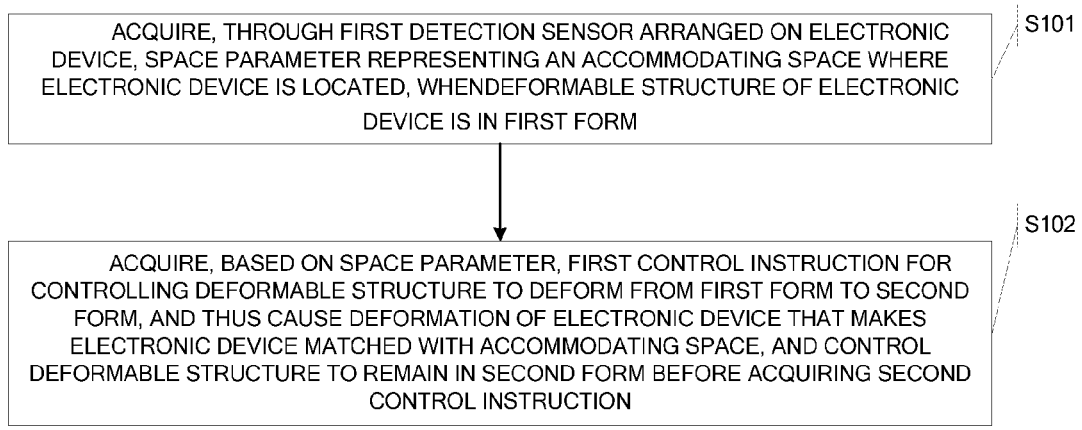
FIG. 4 is a flowchart of a method for controlling an electronic device according to an embodiment of the present disclosure.

As shown in FIG. 4, the method for controlling an electronic device includes:

S101: when a deformable structure of the electronic device is in a first form, acquiring, through a first detection sensor arranged on the electronic device, a space parameter representing an accommodating space where the electronic device is located; and S102: acquiring, based on the space parameter, a first control instruction to control the deformable structure to deform from the first form to a second form, and thus cause a deformation of the electronic device that makes the electronic device matched with the accommodating space, and controlling the deformable structure to remain in the second form before acquiring a second control instruction for controlling the deformable structure to deform from the second form to a third form, the third form being the same as or different from the first form.

The above method will be described below in combination with the structure of the electronic device 10.

Figure 5:
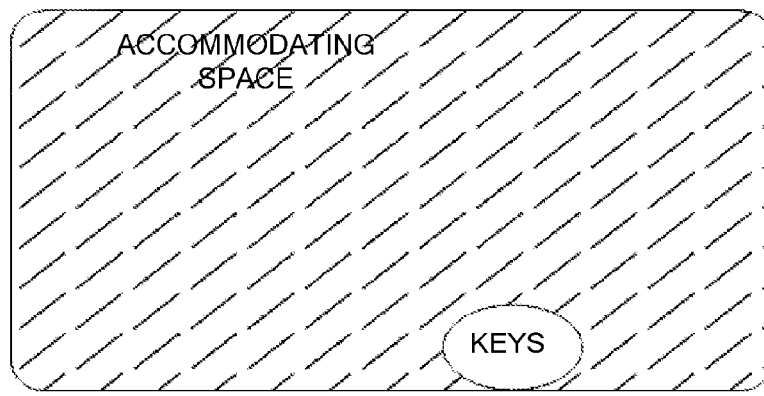
FIG. 5 is a schematic diagram showing an accommodating space according to an embodiment of the present disclosure.

First of all, it should be noted that in one or more embodiments of the present application, the accommodating space is a space capable of accommodating the electronic device. In an example, if a bunch of keys is placed in a laptop bag, the accommodating space is a space capable of accommodating the electronic device excluding the space occupied by the keys, and a surface surrounding the accommodating space is an internal surface of the laptop bag and an external surface of the keys, as shown in FIG. 5.

In an example, when a user places the electronic device 10 in an accommodating space, in order to matching the electronic device 10 with the accommodating space, S101 is performed where the controller 20 controls the first detection sensor 40 to detect a space parameter. The space parameter described here may indicate a shape and an area of at least one surface surrounding the accommodating space, or a volume and a shape of the whole accommodating space, and the like.

Specifically, after the electronic device 10 is powered on, or a detection switch is manually turned on by a user, the controller 20 continuously or periodically controls the first detection sensor 40 to acquire the above space parameter. In an example where the first detection sensor 40 is an image sensor, the controller 20 acquires, through the image sensor, an image parameter of a part of the accommodating space. The part of the accommodating space described here is a part of the accommodating space to which a surface where the image sensor is located is orientated. In another example where the first detection sensor 40 is a distance sensor, the controller 20 acquires, through the distance sensor, a distance parameter representing a distance between at least one surface surrounding the part of the accommodating space and a surface where the distance sensor is located. In a further example where the first detection sensor 40 is a contact sensor, the controller 20 acquires, through the contact sensor, a contact state parameter representing a contact state between at least one surface surrounding the part of the accommodating space and a surface where the contact sensor is located.

Preferably, in order to reduce power consumption of the electronic device and extend power ability of the battery of the electronic device, S101 may further include acquiring, through a second detection sensor, a current state of the electronic device, and when the current state meets a second preset condition, controlling the first detection sensor to acquire a space parameter representing the accommodating space where the electronic device is located. That is, the controller 20 may control the first detection sensor 40 to acquire the space parameter when the current state meets the second preset condition.

In the present embodiment, the second detection sensor may be a different type of sensor from the first detection sensor 40, such as a gravity sensor, an acceleration sensor and the like, or the same type of sensor as the first detection sensor 40, such as a contact sensor, an image sensor and the like, which is not limited in the present application.

Specifically, when the second detection sensor is a gravity sensor or an acceleration sensor, it may be detected, through the sensor, a motion state of the electronic device, for example, whether the electronic device 10 is in a stationary state or a moving state. When it is detected that the current motion state changes from a first state to a second state, it indicates that the current state meets the second preset condition. For example, the current motion state may change from a stationary state to a moving state, from a moving state to a stationary state, or from a first moving state to a second moving state, which is not limited in the present application. At this time, the controller 20 controls the first detection sensor 40 to acquire the space parameter.

In an example where a user places the electronic device 10 in an accommodating space is described. While the user is placing the electronic device 10 in the accommodating space, or when the electronic device 10 has been placed in an accommodating space such as a packbag, it may be detected, through a gravity sensor, that the state of the electronic device 10 changes from a stationary state to a moving state, as the user moves with the bag carried along. At this time, the first detection sensor 40 is triggered and activated. If the accommodating space is stationary, it may be detected, through the gravity sensor, that the state of the electronic device 10 changes from a moving state to a stationary state, when the user places the electronic device 10 in the accommodating space. At this time, the first detection sensor 40 is triggered and activated. In this way, it is unnecessary for the first detection sensor 40 to operate all the time, thereby reducing the power consumption of the electronic device 10 and extending power ability of the battery of the electronic device 10.

When the second detection sensor is a contact sensor, it is detected, through the second detection sensor, a current contact state between the electronic device and at least one surface surrounding the accommodating space, for example, whether they contact with each other, and area, frequency, and time period of their contact. When the current contact state meets a third preset condition, a space parameter representing the accommodating space where the electronic device is located is acquired through the first detection sensor. That is, when the electronic device 10, for example, a surface of the electronic device 10, or the display unit 50, contacts with the at least one surface, it represents that the current contact state meets the third preset condition, i.e., the current state meets the second preset condition. Alternatively, when a surface of the electronic device 10 contacts with the at least one surface at a low frequency, such as twice per minute, four times per minute and the like, it represents that the current contact state meets the third preset condition, i.e., the current state meets the second preset condition. At this time, the controller 20 controls the first detection sensor 40 to acquire the space parameter.

In practical applications, there is another case for S101, i.e., acquiring, through the first detection sensor, a detection result representing a current state of the electronic device, and acquiring the space parameter based on the detection result.

In an example, when the first detection sensor 40 is a pressure sensor, the detection result acquired by the first detection sensor 40 can indicate a contact state, a contact area, a contact region and the like between the at least one surface of the accommodating space and the electronic device 10. At this time, the controller 20 can determine a shape of the accommodating space based on the detection result, so as to acquire the space parameter.

Next, after the above space parameter is acquired in S101, S102 is performed by acquiring, based on the space parameter, a first control instruction to control the deformable structure to deform from the first form to a second form, and thus cause a deformation of the electronic device that makes the electronic device matched with the accommodating space and controlling the deformable structure to remain in the second form before acquiring a second control instruction.

Specifically, the controller 20 acquires the space parameter representing the accommodating space in S101, and the controller 20 acquires, based on the space parameter, a first control instruction to control the deformable structure 30 to deform to a second form, and thus cause the electronic device 10, for example only the display unit 50, or the whole electronic device 10, to deform, so that the electronic device is matched with the above at least one surface or the whole accommodating space. The controller 20 also controls the deformable structure to remain in the deformed shape before acquiring a second control instruction.

In an implementation, in S102, the electronic device may deform in the following two manners, but the present disclosure is not limited thereto.

In a first manner, the electronic device approaches at least one surface surrounding the accommodating space. Then, S102 may include: acquiring, based on the space parameter, a first control instruction to control the deformable structure to deform to a second form, and thus cause a deformation of the electronic device so as to reduce a distance between at least a part of the electronic device and at least one surface surrounding the accommodating space. That is, a distance between at least one surface surrounding the accommodating space and at least a part of the deformed electronic device 10, such as the first surface 101, a second surface, both ends of the electronic device 10, the display unit 50 and the like, is reduced. Assuming that the electronic device 10 is placed in a bag, after the electronic device 10 deforms, the electronic device 10 may approach at least one surface surrounding the accommodating space, i.e., an internal surface of the bag. In this way, a part of space in the bag is saved, enabling a user to put more stuff in the bag. Therefore, the accommodating space is efficiently utilized.

Figure 6A:
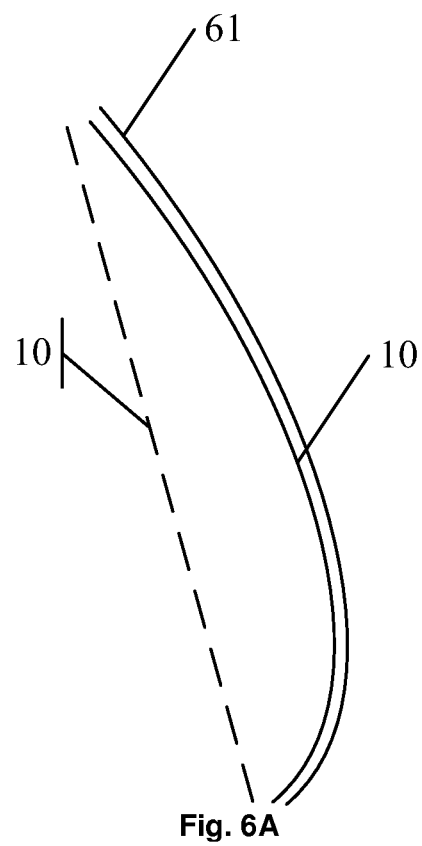
FIGS. 6A-6B are schematic diagrams showing a position relationship when an electronic device is matched with an accommodating space according to an embodiment of the present disclosure.

In an example, as shown in FIG. 6A, if the surface surrounding the accommodating space is a curved surface 61, the controller 20 determines a shape, an area, a curvature and the like of the curved surface 61 in S101, and thus controls the deformable structure 30 to deform from a first form to a second form with the same curvature, causing the electronic device 10 to deform from a shape indicated by the dotted line to a curved surface in the same curved condition as the curved surface 61 indicated by the solid line. In this way, a distance between both ends of the electronic device 10 and the curved surface 61 is reduced, or even the electronic device 10 can fit into the curved surface 61, and occupy a smaller space, and then a user can place other items in the accommodating space.

In a second manner, the electronic device moves away from at least one surface surrounding the accommodating space. Then, S102 may include: acquiring, based on the space parameter, a first control instruction to control the deformable structure to deform to a second form, and thus cause a deformation of the electronic device so as to increase a distance between at least a part of the electronic device and at least one surface surrounding the accommodating space. That is, a distance between at least one surface surrounding the accommodating space and at least a part of the deformed electronic device 10, such as the first surface 101, a second surface, both ends of the electronic device 10, the display unit 50 and the like, is increased. Assuming that a bunch of keys is placed in a bag where the electronic device 10 is placed, and a surface of the keys has sharp edges and corners. In order to avoid the electronic device 10 from being scratched by the keys, after the electronic device 10 deforms, the electronic device 10 can move away from at least one surface of the accommodating space, i.e., the surface of the keys. In this way, it is possible to prevent the electronic device 10 from contacting with the keys, thereby avoiding scratching of the electronic device 10.

Figure 6B:
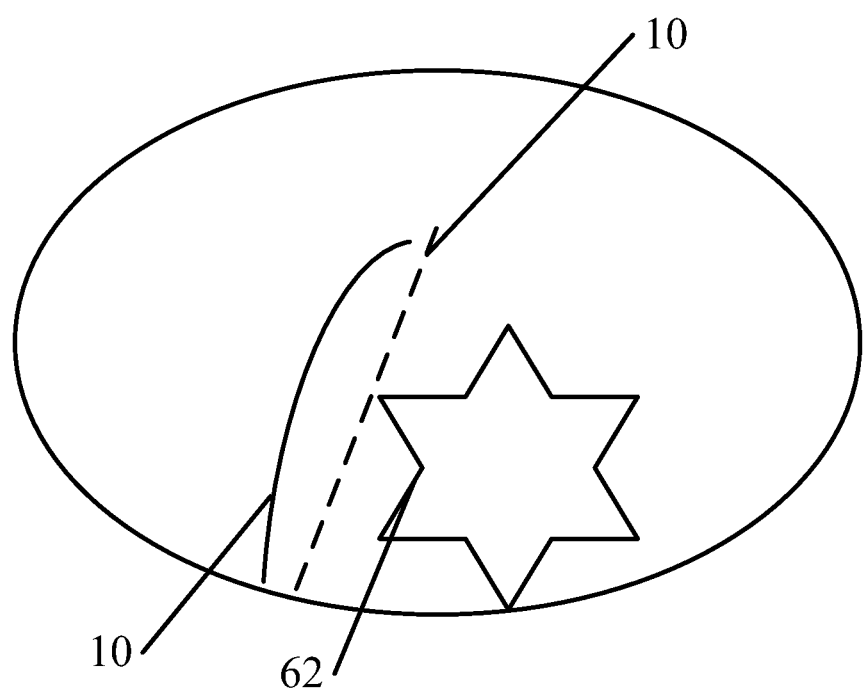

In an example, as shown in FIG. 6B, if a surface 62 surrounding the accommodating space is an irregular-shaped surface, the controller 20 determines a shape, an area and the like of the surface 62 in S101, and thus controls the deformable structure 30 to deform to a second form, causing the electronic device 10 to deform from a shape indicated by the dotted line to a curved surface matched with the surface 62 indicated by the solid line, and accordingly the distance between the electronic device 10 and the surface 62 is increased.

Further, S102 may include: determining, based on the space parameter, whether at least one surface of the accommodating space meets a first preset condition; and if so, acquiring a first control instruction to control the deformable structure to deform from the first form to a second form, and thus cause a deformation of the electronic device that makes the electronic device matched with the accommodating space. That is, before the first control instruction is acquired, the controller 20 determines whether a deformation of the electronic device 10 is required based on the space parameter. Also as shown in FIG. 5, assuming that the space parameter indicates that a contact area between the electronic device 10 and an external surface of the keys in the accommodating space is large, it may be determined that at least one surface of the accommodating space does not meet the first preset condition; or the space parameter indicates that the electronic device 10 contacts with the external surface of the keys at a low frequency, such as twice per minute, it may also be determined that at least one surface of the accommodating space does not meet the first preset condition. Otherwise, it is determined that at least one surface of the accommodating space meets the first preset condition, and then the controller 20 controls the electronic device 10 to deform. The first preset condition may be different according to practical conditions, which is not limited in the present application.

Based on the above inventive concept, the present application further provides an electronic device, which may be a smart phone, a tablet, a wearable device, a multimedia player and the like. As shown in FIG. 1, illustrated is a functional block diagram of an electronic device 10, which may include a controller 20 arranged in the electronic device 10; a deformable structure 30 arranged on the electronic device 10 and connected to the controller 20; a first detection sensor 40 arranged on the electronic device 10 and connected to the controller 20. When the deformable structure 30 is in a first form, the controller 20 acquires, through the first detection sensor 40, a space parameter representing an accommodating space where the electronic device 10 is located, and acquire, based on the space parameter, a first control instruction to control the deformable structure 30 to deform from the first form to a second form, and thus cause a deformation of the electronic device 10 that makes at least a part of the electronic device 10 matched with the accommodating space, and controls the deformable structure 30 to remain in the second form before acquiring a second control instruction for controlling the deformable structure 30 to deform from the second form to a third form. The third form may be the same as or different from the first form.

Further, as shown in FIG. 2, the first detection sensor 40 is an image sensor at least arranged on a first surface 101 of the electronic device 10, and the controller 20 acquires, through the image sensor, an image parameter of a part of the accommodating space. Then, the controller 20 controls the deformable structure 30 to deform to the second form, causing the first surface 101 to approach or move away from at least one surface surrounding the part of the accommodating space. The part of the accommodating space may be a part of the accommodating space to which the first surface 101 is orientated.

Further, also as shown in FIG. 2, the first detection sensor 40 is a distance sensor at least arranged on a first surface 101 of the electronic device 10, and the controller 20 acquires, through the distance sensor, a distance parameter representing a distance between at least one surface surrounding a part of the accommodating space and the first surface 101, that the controller 20 controls the deformable structure 30 to deform to the second form, causing the first surface 101 to approach or move away from the at least one surface. The part of the accommodating space may be a part of the accommodating space to which the first surface 101 is orientated.

Further, also as shown in FIG. 2, the first detection sensor 40 is a contact sensor at least arranged on a first surface 101 of the electronic device 10, and the controller 20 acquires, through the contact sensor, a contact state parameter representing a contact state between at least one surface surrounding a part of the accommodating space and the first surface 101, that the controller 20 controls the deformable structure 30 to deform to the second form, causing the first surface to approach or move away from the at least one surface. The part of the accommodating space may be a part of the accommodating space to which the first surface 101 is orientated.

In practical applications, the first detection sensor 40 may be any of many types of sensors or a combination thereof, may be a single sensor or an array of sensors, and may be arranged on the first surface 101 or other surface. The contact sensor described here is a sensor for detecting contact with an object, for example, a pressure sensor, a touch screen and the like.

Alternatively, the first surface 101 has a display unit 50 arranged thereon, and the display unit 50 may be a flexible display screen. The controller 20 controls the deformable structure 30 to deform, causing the display unit 50 to deform to be matched with the accommodating space.

Alternatively, in order to reduce the power consumption of the electronic device and extend power ability of the battery of the electronic device, the electronic device 10 may further include a second detection sensor. A current state of the electronic device 10 may be acquired through the second detection sensor, and when the current state meets a second preset condition, the first detection sensor 40 is controlled to acquire a space parameter representing the accommodating space where the electronic device 10 is located.

That is, the controller 20 may control the first detection sensor 40 to acquire the space parameter when the electronic device 10 meets the second preset condition.

In the present embodiment, the second detection sensor may be a different type of sensor from the first detection sensor 40, such as a gravity sensor, an acceleration sensor and the like, or may be the same type of sensor as the first detection sensor 40, such as a contact sensor, an image sensor and the like, which is not limited in the present application.

Specifically, when the second detection sensor is a gravity sensor or an acceleration sensor, it may be detected, through the sensor, a motion state of the electronic device, for example, whether the electronic device 10 is in a stationary state or a moving state. When it is detected that the current motion state changes from a first state to a second state, it indicates that the current state meets a third preset condition, i.e., the electronic device 10 meets the second preset condition. For example, the current motion state may change from a stationary state to a moving state, from a moving state to a stationary state, or from a first moving state to a second moving state, which is not limited in the present application. At this time, the controller 20 controls the first detection sensor 40 to acquire the space parameter.

When the second detection sensor is a contact sensor, it is detected, through the second detection sensor, a current contact state between the electronic device and at least one surface surrounding the accommodating space, for example, whether they contact with each other, and area, frequency of their contact, and the like. When the current contact state meets a fourth preset condition, a space parameter representing the accommodating space where the electronic device is located is acquired through the first detection sensor. That is, when the electronic device 10, for example, a surface of the electronic device 10, or the display unit 50, contacts with the at least one surface, it represents that the current contact state of the electronic device 10 meets a third preset condition, i.e., the electronic device 10 meets the second preset condition. Alternatively, when a surface of the electronic device 10 contacts with the at least one surface at a low frequency, such as twice per minute, four times per minute and the like, it represents that the current contact state meets the third preset condition, i.e., the electronic device 10 meets the second preset condition. At this time, the controller 20 controls the first detection sensor 40 to acquire the space parameter.

Further, the deformable structure 30 may be arranged on a frame located on an edge of a housing of the electronic device 10. The frame is comprised of hinge, or is made of memory metal.

In another embodiment, the electronic device 10 may be a wearable device. Then, the controller 30 controls the deformable structure 30 to deform to a second form, causing the electronic device 10 to deform and act as at least a part of an annular space or a near-annular space meeting a fourth preset condition. The annular space or the near-annular space is able to surround a columnar body meeting a fifth preset condition.

Figure 7:
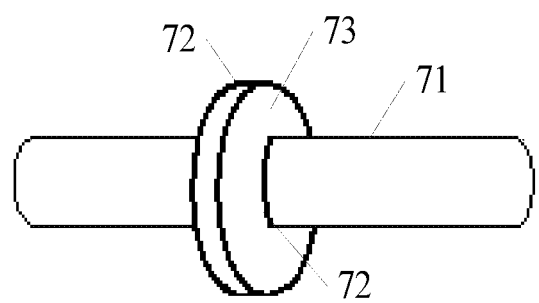
FIG. 7 is a schematic diagram showing an accommodating space according to another embodiment of the present disclosure.

It should be noted that with respect to the wearable device as shown in FIG. 7, an accommodating space 73 thereof is a space surrounding the columnar body 71. Then, a surface 72 surrounding the accommodating space 73 consists of an external surface of the columnar body 71 and a surface at a distance from the external surface. When a user places the wearable device in the accommodating space 73, the wearable device may deform, based on a space parameter, to approach the external surface of the columnar body, or to move away from the external surface of the columnar body.

In an example, the electronic device 10 is a smart watch. After the electronic device 10 deforms, a closed annular shape or a near-annular shape having an opening, is formed as at least a part of an annular space or a near-annular space. The annular space or the near-annular space surrounds a user's arm. The opening of the near-annular space should be smaller than the columnar body to be surrounded by the electronic device 10, i.e., smaller than a diameter of the user's arm. The annular space or the near-annular space having an opening should have a diameter larger than a diameter of the user's wrist and smaller than a diameter of the user's fist. When the user places the smart watch in the accommodating space thereof, the controller 20 may control, based on the space parameter detected by the first detection sensor 40, the deformable structure 30 to deform, to form the above annular shape or near-annular shape, so as to approach at least one surface surrounding the accommodating space, i.e., the external surface of the user's arm. In this way, the smart watch is worn on the arm by the user. Further, when it is detected, through a second detection sensor, that an arm swing frequency or a moving speed of a user increases, the controller 20 may control, based on the space parameter detected by the first detection sensor 40, the deformable structure 30 to deform for example from a first degree of curvature to a second degree of curvature, so that the electronic device 10 approaches the user's arm, thereby preventing the electronic device 10 from falling down in the process of arm swing or the user's movement. The first detection sensor 40 may be triggered to operate by a user operating a button or turning on an application such as a pedometer. Alternatively, when the user wants to take off the smart phone, the user may manually operate a switch or turn off an application such as a pedometer. At this time, the controller 20 controls the first detection sensor 40 to operate, and controls, based on the space parameter detected by the first detection sensor 40, the deformable structure 30 to deform, so as to move away from at least one surface surrounding the accommodating space, i.e., the external surface of the user's arm. In this way, the user can take off the smart watch. Further, the controller 20 may also control the first detection sensor 40 to operate when it is detected, through the second detection sensor, that the arm swing frequency or the moving speed of the user decreases.

Various variations in the method for controlling an electronic device in the above embodiments and specific examples can be similarly applicable to the electronic device in the present embodiment. With the above detailed description of the method for controlling an electronic device, implementation of the electronic device in the present embodiment is obvious to those skilled in the art, and therefore will not be described in detail here for sake of concision of the specification.

One or more embodiments of the present disclosure provide at least the following technical effects.

When a deformable structure of the electronic device is in a first form, a space parameter representing an accommodating space where the electronic device is located is acquired through a first detection sensor arranged on the electronic device; and then a first control instruction is acquired based on the space parameter, for controlling the deformable structure to deform from the first form to a second form, and thus cause a deformation of the electronic device that makes the electronic device matched with the accommodating space, and the deformable structure is controlled to remain in the second form before acquiring a second control instruction. That is, when the deformable structure is in a first form, the above space parameter is acquired by the first detection sensor, and then the deformable structure is controlled based on the parameter, causing the electronic device to deform to be matched with the accommodating space thereof. In this way, the electronic device can autonomously deform to a shape matched with the accommodating space thereof based on the acquired space parameter without requirement for any external force. This solves the problem that the conventional electronic device cannot autonomously become matched with the accommodating space thereof, and enables the electronic device to autonomously deform to be matched with the accommodating space thereof, thereby improving intelligence of the electronic device and providing good user experience.

Those skilled in the art should appreciate that the embodiments of the present disclosure can be provided as methods, systems, or computer program products. Therefore, forms such as hardware-only embodiments, software-only embodiments, or embodiments combining software and hardware can be used in the present disclosure. In addition, forms such as a computer program product which is implemented on one or more of computer usable storage media (comprising but not limited to a disk memory, a CD-ROM, an optical memory etc.) with computer usable program codes can be used in the present disclosure.

The present disclosure is described with reference to the flowcharts and/or block diagrams of the methods, devices (systems) and computer program products according to the embodiments of the present disclosure. It should be understood that each flow and/or block in the flowcharts and/or block diagrams as well as a combination of the flows and/or blocks in the flowcharts and/or block diagrams can be implemented by computer program instructions. These computer program instructions can be provided to a processor of a general-purpose computer, a dedicated-purpose computer, an embedded processor, or other programmable data processing devices to generate a machine. Thereby, the instructions executed by the processor of the computer or other programmable data processing devices generate means for implementing functions specified in one or more flows in the flowcharts and/or one or more blocks in the block diagrams.

These computer program instructions can also be stored in a computer readable memory capable of introducing a computer or other programmable data processing devices to operate in a particular mode. Thereby, the instructions stored in the computer readable memory generate an article of manufacture comprising instruction means for implementing functions specified in one or more flows in the flowcharts and/or one or more blocks in the block diagrams.

These computer program instructions can also be loaded onto a computer or other programmable data processing devices, so as to enable a series of operation steps to be performed on the computer or other programmable devices to generate a computer-implemented process. Thereby, the instructions executed on the computer or other programmable devices provide a step of implementing functions specified in one or more flows in the flowcharts and/or one or more blocks in the block diagrams.

Although preferable embodiments of the present disclosure have been described, additional changes and modifications can be made to these embodiments by those skilled in the art upon learning the basic creative concepts. Therefore, the appended claims are intended to be construed as comprising the preferable embodiments and all changes and modifications that fall into the scope of the present disclosure.

Obviously, various modifications and variants can be made to the present disclosure by those skilled in the art without departing from the spirit and scope of the present disclosure. Therefore, these modifications and variants are to be encompassed by the present disclosure if they fall within the scope of the present disclosure as defined by the claims and their equivalents.

What is claimed is:

1. A method for controlling an electronic device, comprising:
    acquiring, through a first detection sensor arranged on the electronic device, a parameter of a space within an object that accommodates the electronic device, when a deformable structure of the electronic device is in a first form; and
    acquiring, based on the parameter, a first control instruction to control the deformable structure to deform from the first form to a second form, and thus cause a deformation of the electronic device that makes the electronic device matched with the space within the object, and controlling the deformable structure to remain in the second form before acquiring a second control instruction for controlling the deformable structure to deform from the second form to a third form, the third form being the same as or different from the first form,
    wherein the deformation of the electronic device that makes the electronic device matched with the space within the object comprises:
    a deformation of the electronic device that reduces a distance between at least a part of the electronic device and at least one surface of the object, or
    a deformation of the electronic device that increases a distance between at least a part of the electronic device and at least one surface of the object.

2. The method according to claim 1, wherein said acquiring the first control instruction to control the deformable structure to deform from the first form to the second form further comprises:
    determining, based on the parameter, whether at least one surface of the object meets a first preset condition; and
    if so, acquiring, based on the parameter, the first control instruction to control the deformable structure to deform from the first form to the second form, and thus cause the deformation of the electronic device that makes the electronic device matched with the space within the space.

3. The method according to claim 1, wherein said acquiring the parameter of the space further comprises:
    acquiring, through the first detection sensor, a detection result representing a current state of the electronic device; and
    acquiring the parameter based on the detection result.

4. A method for controlling an electronic device, comprising:
    acquiring, through a first detection sensor arranged on the electronic device, a space parameter representing an accommodating space where the electronic device is located, when a deformable structure of the electronic device is in a first form; and
    acquiring, based on the space parameter, a first control instruction to control the deformable structure to deform from the first form to a second form, and thus cause a deformation of the electronic device that makes the electronic device matched with the accommodating space, and controlling the deformable structure to remain in the second form before acquiring a second control instruction for controlling the deformable structure to deform from the second form to a third form, the third form being the same as or different from the first form,
    wherein said acquiring, through a first detection sensor arranged on the electronic device, a space parameter representing an accommodating space where the electronic device is located further comprises:
    acquiring, through a second detection sensor, a current state of the electronic device; and
    when the current state meets a second preset condition, controlling the first detection sensor to acquire the space parameter representing the accommodating space where the electronic device is located.

5. The method according to claim 4, wherein said acquiring, through a second detection sensor, a current state of the electronic device further comprises:
    detecting, through the second detection sensor, a motion state of the electronic device, wherein when it is detected that the current motion state changes from a first state to a second state, it indicates that the current state meets the second preset condition.

6. The method according to claim 4, wherein said acquiring, through a second detection sensor, a current state of the electronic device further comprises:
    detecting, through the second detection sensor, a current contact state between the electronic device and at least one surface of the object, wherein when the current contact state meets a third preset condition, it indicates that the current state meets the second preset condition.

7. An electronic device, comprising:
    a controller arranged in the electronic device;
    a deformable structure arranged on the electronic device and connected to the controller; and
    a first detection sensor arranged on the electronic device and connected to the controller, wherein,
    when the deformable structure is in a first form, the controller
        acquires, through the first detection sensor, a parameter of a space within an object that accommodates the electronic device,
        acquires, based on the parameter, a first control instruction to control the deformable structure to deform from the first form to a second form, and thus cause a deformation of the electronic device that makes at least a part of the electronic device matched with the space, and
        controls the deformable structure to remain in the second form before acquiring a second control instruction for controlling the deformable structure to deform from the second form to a third form, the third form being the same as or different from the first form, wherein the deformation of the electronic device that makes the electronic device matched with the space within the object comprises:
a deformation of the electronic device that reduces a distance between at least a part of the electronic device and at least one surface of the object, or
a deformation of the electronic device that increases a distance between at least apart of the electronic device and at least one surface of the object.

8. The electronic device according to claim 7,
wherein the first detection sensor is an image sensor arranged on at least a first surface of the electronic device, and
wherein the controller acquires, through the image sensor, an image parameter of a part of the space within the object, and the controller controls the deformable structure to deform to the second form and thus cause the first surface to approach or move away from at least one surface of the object to which the first surface is orientated.

9. The electronic device according to claim 7,
wherein the first detection sensor is a distance sensor arranged on at least a first surface of the electronic device, and
wherein the controller acquires, through the distance sensor, a distance parameter representing a distance between at least one surface of the object and the first surface, and the controller controls the deformable structure to deform to the second form and thus cause the first surface to approach or move away from the at least one surface to which the first surface is orientated.

10. The electronic device according to claim 7,
wherein the first detection sensor is a contact sensor arranged on at least a first surface of the electronic device, and
wherein the controller acquires, through the contact sensor, a contact state parameter representing a contact state between at least one surface of the object and the first surface, and the controller controls the deformable structure to deform to the second form and thus cause the first surface to approach or move away from the at least one surface to which the first surface is orientated.

11. The electronic device according to claim 7,
wherein the electronic device has a second surface on which a display unit is arranged, and
wherein the controller controls the deformable structure to deform, and thus cause a deformation of the display unit that makes the display unit matched with the space within the object.

12. The electronic device according to claim 7, wherein the first detection sensor comprises a single sensor or an array of sensors arranged on at least one surface of the electronic device.

13. An electronic device, comprising:
a controller arranged in the electronic device:
a deformable structure arranged on the electronic device and connected to the controller; and
a first detection sensor arranged on the electronic device and connected to the controller,
wherein, when the deformable structure is in a first form, the controller
acquires, through the first detection sensor, a space parameter representing an accommodating space where the electronic device is located,
acquires, based on the space parameter, a first control instruction to control the deformable structure to deform from the first form to a second form, and thus cause a deformation of the electronic device that makes at least a part of the electronic device matched with the accommodating space, and
controls the deformable structure to remain in the second form before acquiring a second control instruction for controlling the deformable structure to deform from the second form to a third form, the third form being the same as or different from the first form;
wherein the electronic device further comprises a second detection sensor through which a current state of the electronic device can be acquired, and
when the current state meets a second preset condition, the first detection sensor is controlled to acquire the space parameter representing the accommodating space where the electronic device is located.

14. An electronic device, comprising:
a controller arranged in the electronic device;
a deformable structure arranged on the electronic device and connected to the controller; and
a first detection sensor arranged on the electronic device and connected to the controller,
wherein, when the deformable structure is in a first form, the controller
acquires, through the first detection sensor, a space parameter representing an accommodating space where the electronic device is located,
acquires, based on the space parameter, a first control instruction to control the deformable structure to deform from the first form to a second form, and thus cause a deformation of the electronic device that makes at least a part of the electronic device matched with the accommodating space, and
controls the deformable structure to remain in the second form before acquiring a second control instruction for controlling the deformable structure to deform from the second form to a third form, the third form being the same as or different from the first form;
wherein the controller is configured to control the deformable structure to deform to the second form, and thus cause a deformation of the electronic device that makes the electronic device act as at least a part of an annular space or a near-annular space meeting a fourth preset condition, the annular space or the near-annular space being capable of surrounding a columnar body meeting a fifth preset condition.

15. An electronic device, comprising:
a controller arranged in the electronic device;
a deformable structure arranged on the electronic device and connected to the controller; and
a first detection sensor arranged on the electronic device and connected to the controller,
wherein, when the deformable structure is in a first form, the controller
acquires, through the first detection sensor, a space parameter representing an accommodating space where the electronic device is located,
acquires, based on the space parameter, a first control instruction to control the deformable structure to deform from the first form to a second form, and thus cause a deformation of the electronic device that makes at least a part of the electronic device matched with the accommodating space, and
controls the deformable structure to remain in the second form before acquiring a second control instruction for controlling the deformable structure to deform from the second form to a third form, the third form being the same as or different from the first form;
wherein the deformable structure is a frame arranged on an edge of a housing of the electronic device, the frame being comprised of hinge or made of memory metal.

\* \* \* \* \*